United States Patent
Rodgers

(10) Patent No.: US 7,839,276 B2
(45) Date of Patent: Nov. 23, 2010

(54) SECURE SELF SCAN

(76) Inventor: James Neil Rodgers, 8853 214th Place, Langley, BC (CA) V1M 2H9

( * ) Notice: Subject to any disclaimer, the term of this patent is extended or adjusted under 35 U.S.C. 154(b) by 389 days.

(21) Appl. No.: 11/736,245

(22) Filed: Apr. 17, 2007

(65) Prior Publication Data

US 2008/0258877 A1 Oct. 23, 2008

(51) Int. Cl.
*G08B 1/08* (2006.01)

(52) U.S. Cl. ............... 340/501; 340/539.1; 340/539.32; 340/568.7; 340/572.1

(58) Field of Classification Search ............ 340/539.1, 340/539.13, 539.21, 539.32, 565, 501, 567, 340/568.7, 572.1, 572.8, 572.9
See application file for complete search history.

(56) References Cited

U.S. PATENT DOCUMENTS 6,121,544 A * 9/2000 Petsinger ................... 174/353
6,378,684 B1 * 4/2002 Cox ........................... 194/213
2006/0187061 A1 * 8/2006 Colby ...................... 340/572.8
2007/0069858 A1 * 3/2007 Kubo ......................... 340/10.1
2008/0079588 A1 * 4/2008 Hughes et al. ........... 340/572.8

* cited by examiner

Primary Examiner—Daryl Pope

(57) ABSTRACT

This invention includes the system and method for the manufacture and use of a hermetically sealed Faraday cage in the retail/consumer goods environment. It is called the "Secure Self Scan" and is constructed using meshed glass, sheet metal and edge level elastomers as agents of containment and reflection. The invention prevents unauthorized access to communication protocols between RFID tagged consumer items and an RFID interrogator. It also prevents unauthorized access to communication protocols between an RFID interrogator and contact less smart card. This invention takes the mal ware writer and hacker plus the skimmer and eavesdropper out of the RFID equation in relationship to consumer goods, contact less smart cards and consumer privacy. Furthermore, this invention magnifies RFID interrogation signals within the Secure Self Scan unit thereby increasing read rates while concurrently obviating external electromagnetic interference, thereby increasing RFID tag read rates.

7 Claims, 3 Drawing Sheets

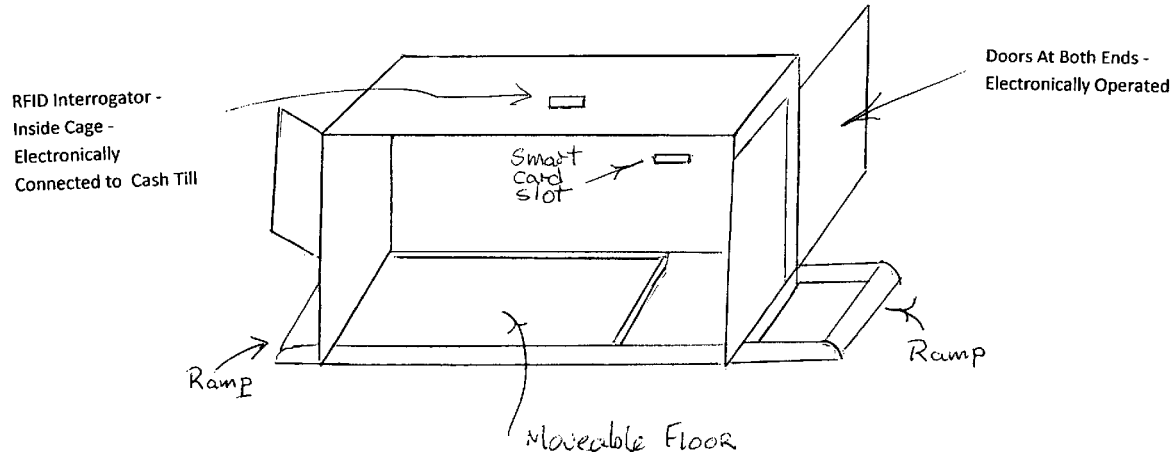

1. Top, Base, Sides and Doors constructed of Meshed Glass, Sheet metal and edge level elastomers as agents of containment and reflection.

2. Cage Floor above base is moveable on electric motor operated rollers. It is less than length of cage to enable positioning in operation above electronic weight scan and through glass aperture/

3. Method of Construction designed to magnify RFID Interrogation signals and obviate external magnetic interference to increase tag read rates.

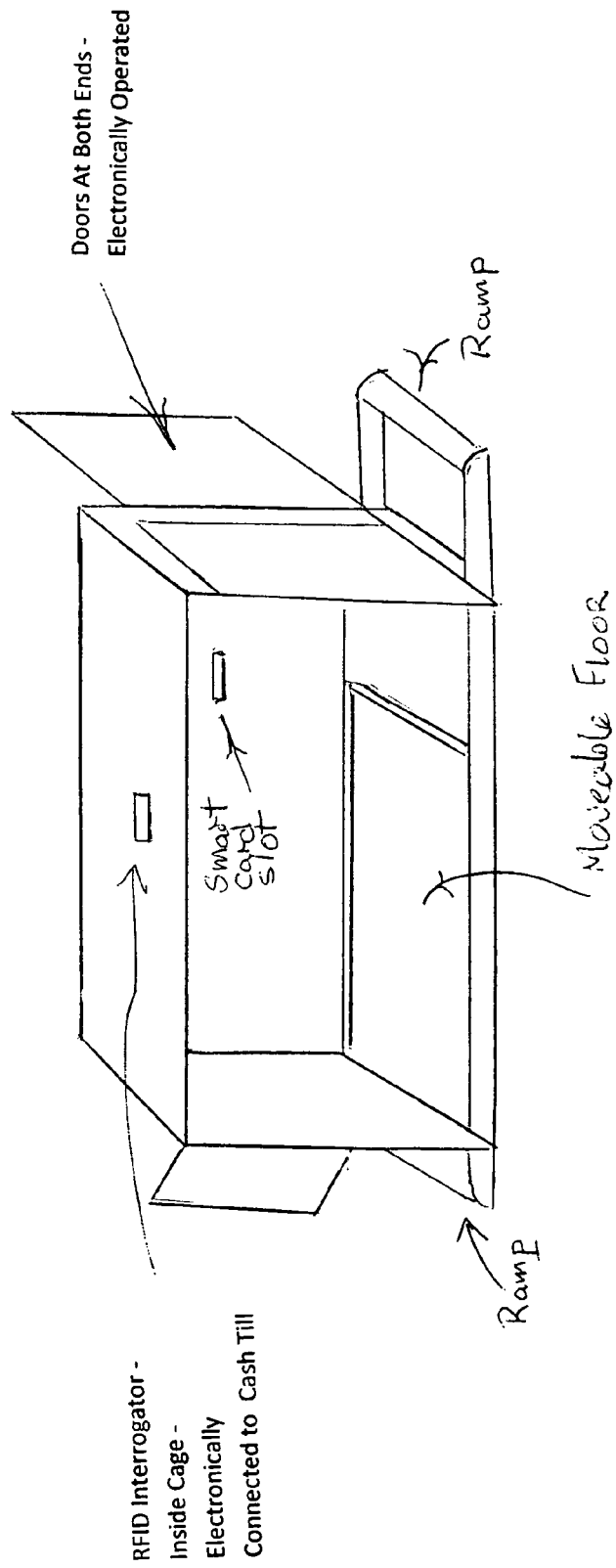

FIGURE 1: SECURE SELF SCAN
BASIC CONSTRUCTION: ILLUSTRATIVE - NOT TO SCALE

1. Top, Base, Sides and Doors constructed of Meshed Glass, Sheet metal and edge level elastomers as agents of containment and reflection.

2. Cage Floor above base is moveable on electric motor operated rollers. It is less than length of cage to enable positioning in operation above electronic weight scan and through glass aperture/

3. Method of Construction designed to magnify RFID Interrogation signals and obviate external magnetic interference to increase tag read rates.

FIGURE 2: SECURE SELF SCAN
BASIC OPERATION:START

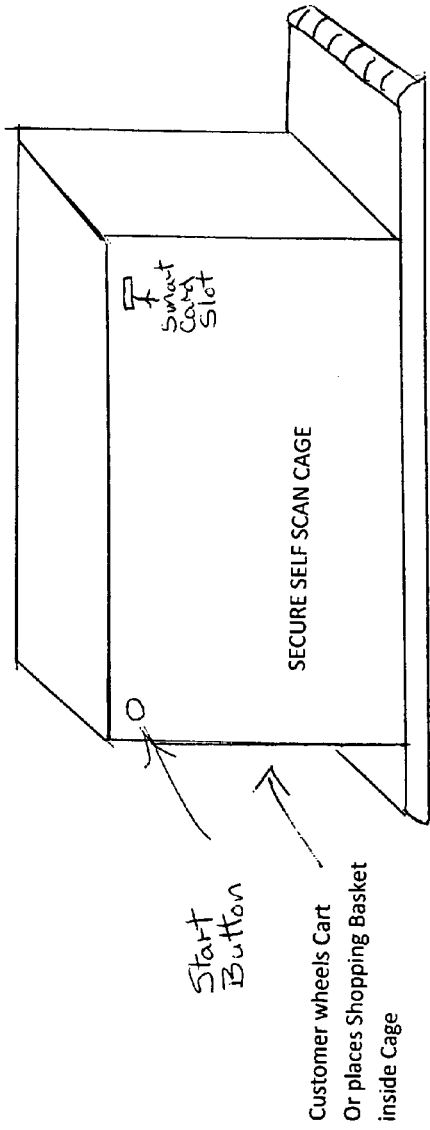

1. Customer presses electronic start button. This causes doors at both ends to close.
2. Time delayed electronic signal causes floor to be rolled into position for electronic weighing once doors are securely closed.
3. Once floor into position, time delayed electronic signal causes RFID Interrogator to commence scanning RFID transponder tagged articles and electronic weighing to commence. Cash till, electronically connected to RFID Interrogator and Electronic Weight calculator, displays cost of purchase and either or both of points awarded or cash discount for Self Scan.
4. Customer approves payment by placing RF smart card in slot and net funds are deducted.

Note: In case of bulk foods transponder tagged ties are placed in containers on top of bulk food bins. These are then used to tie bags in which bulk foods loaded to provide unique ID of bulk foods.

FIGURE 3: SECURE SELF SCAN
COMPLETION OF OPERATION

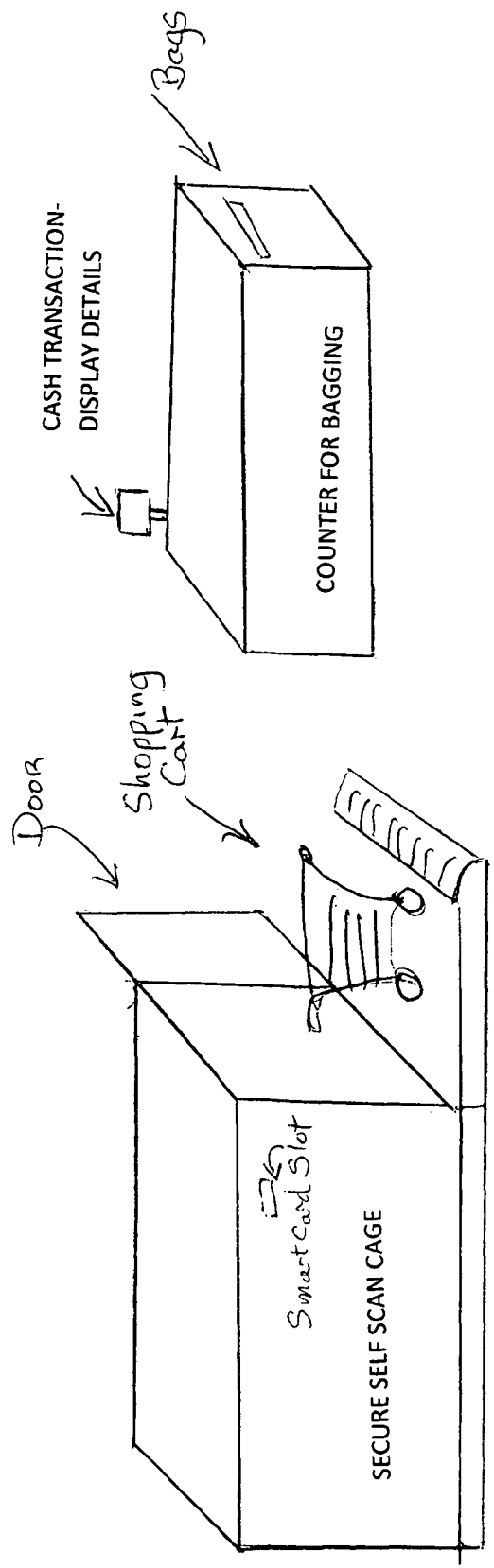

1. Smart Card is ejected when transaction completed
2. Doors electronically open when transaction completed.
3. Electronically operated motor automatically moves roller enabled Cage floor to Cage exit and beyond for pick up of shopping cart or basket by customer.
4. Moveable floor detects when shopping cart or shopping basket removed and moves roller enabled floor back to entrance of cage.
5. Customer retrieves cart or basket, retrieves goods and bags.

SECURE SELF SCAN

FIELD OF INVENTION

This invention is in the field of Radio Frequency Identification (RFID) and more specifically relates to the interrogation of RFID tagged retail consumer items.

BACKGROUND

This invention is a system and method for the production of an RFID interrogator/reader engineered into a Faraday cage device. It is designed to perform secure interrogating/reading of RFID tagged retail consumer items. One of the functions of the invention is to protect consumers from unauthorized reading of RFID tags which are attached to or embedded within their retail purchases. For example, if an RFID electro magnetic signal is read surreptitiously during the communication process between reader and tag then the information has been effectively "skimmed". This is the bailiwick of identity thieves and those involved in commercial crime.

An RFID interrogator, also known as an RFID reader, is an electronic device which generates and receives an interrogation signal. This signal is electro magnetic in nature. The electro magnetic signals are radiated or harvested by an antenna or an array of antennas which are integral to the interrogator. The functionality of the interrogator includes reading and writing information to RFID tags, also known as transponders. The interrogators can operate on one or a multiple of electro magnetic frequencies. Moreover, the interrogator can perform an anti-collision function effectively distinguishing the reflected signal from tags.

There are basic components which make up an RFID industry standard interrogator. There is a receiver which contains an amplifier and a demodulator. There is also a transmitter that contains a modulator and a power amplifier. Moreover, there is an oscillator, a controller/processor and a send and receive port for an antenna attachment. The purpose of these different components needs to be understood to fully comprehend the import of this invention. When harvesting or capturing an electro magnetic signal from an RFID tag the amplifier expands the electro magnetic signal received in the antenna for the purpose of processing the information contained in the signal. The demodulator extracts the data from the signal which has been harvested by the antenna. The controller/processor processes the data or information received and communicates this data with external networks.

During the process of broadcasting or transmission by the interrogator the oscillator provides the carrier signal to the modulator and a reference signal to the demodulator circuits. The modulator adds the information to the electro magnetic signal which is destined for the transponder. The power amplifier increases the strength of the modulated electro magnetic signal and then routes it to the broadcasting antenna. The function of the antenna is to radiate the electro magnetic signal to the transponder.

There are different methods whereby an interrogator communicates with a tag or transponder depending on whether the tag or transponder is active or passive. The passive and semi-passive tags use a backscatter methodology to deliver information from the tag to the interrogator. The electro magnetic signal radiated by the antenna on the interrogator is demodulated by the tag in order to decode the instructions from the interrogator. The data requested by the interrogator is by way of electro magnetic signal which signal power is used by the tag in order to power a reflective electro magnetic signal containing the information requested by the interrogator back to the interrogator through the modulated signal. Active tag communication is different in that the tag does not reflect the energy of the interrogator. The active tag has its own power source and therefore can transmit information independent of any signal transmitted by the interrogator.

The ability for an interrogator to successfully communicate with a tag is dependent upon two significant factors. Communication is dependent on the distance between the interrogator and the tag. It is also dependent upon the type of tag and its dwell time. The dwell time is the time a tag is in the electro magnetic field of the interrogator. The read range is the maximum distance between the interrogator and the RFID tag whereby the tag can be properly read without diminution in signal.

There are different types of RFID interrogators. There is a fixed type, a hand-held type plus mobile interrogators. The fixed interrogators are usually mounted to walls, doors, or other structures. They can also be integrated into stationary devices, such as conveyor belts or at door portals. The fixed types of interrogators do need an external power source. They can be hard wired or wirelessly connected to a local area network. The hand-held interrogators are usually "gun" shaped and are much smaller than the fixed type. The capabilities of the hand held type are similar to those of the fixed variety. They usually have an antenna built into the unit and are used primarily for exception processing due to their portability and capabilities. They are normally connected directly into the local area network through a wireless connection. The hand-held types are frequently battery powered. The mobile type of interrogators can have PCMCIA cards included in order to connect to laptop PCs. These interrogators can come in different forms such as mobile phones or PDA or vehicle mounted. They are usually powered from an internal battery pack. They are typically wireless in connectivity and are typically mounted on forklifts or clamp trucks. They are manufactured to withstand environmental extremes.

There are RFID interrogation zone considerations which need to be understood to fully comprehend this invention. For example, collision zones occur when there is an RFID system with multiple interrogators operating concurrently which results in electro magnetic signals interfering with each other to the point of negating the signals of some. In this circumstance where readers have overlapping interrogation zones a dense interrogation mode for the reader is necessary. Other strategies to deal with overlapping signals are interrogator synchronization, arbitration, and anti collision protocols. In the dense interrogator mode each interrogator operates at a slightly different frequency so as not to interfere with each other. Furthermore, there is a listen before transmitting protocol known as Listen Before Talk (LBT) which utilizes an algorithm to listen or hear whether another interrogator is using a particular frequency. If an interrogator is heard to be using one particular frequency then the interrogator wishing to operate rolls to another frequency before beginning communication. There is also a system of frequency hopping where the interrogation signals hop between channels within a certain frequency spectrum. For example the interrogation signals would hop between 902 MHz and 928 MHz and they can listen for a signal before using any specific frequency channel. There is often a requirement for interrogator synchronization. This occurs in the circumstance of multiple interrogators operating at the same time in the same place. The electro magnetic signals radiating from the antenna of one interrogator may interfere with the electro magnetic signals radiating from the antennas of other interrogators. This can cause RFID transponders to be misread or not read at all. This type of interference is a function of a number of variables. The size and types of antennas and the output power of the antennas plus the distance between antennas are all critical factors. Synchronization of the interrogators in an RFID system can be accomplished in a number of fashions. Software synchronization uses a common communication bus for all interrogators within a system. In this way the back end controlling host computer is able to administer each interrogator by issuing commands to transmit at separate times for each interrogator. There is also a multiplex method whereby a single interrogator is connected through a switch box to multiple antennas. The interrogator radiation is directed to each antenna separately and in turn ensuring that only one antenna is transmitting at any given time. There is also the shielding method which prevents interference between interrogators by acting as a physical barrier to prevent one tag from being interrogated by two antennas. There are other methods of synchronization. For example there are anti collision software remedies for the problem of interrogator electro magnetic interference with each other. When two or more tags respond simultaneously to an interrogation there is a collision of information. Anti collision processing is the means by which the interrogator distinguishes one tag from the others so that only one tag is processed at a time. Anti collision algorithms are commonly classified as either probabilistic or deterministic. In the probabilistic algorithms, also called asynchronous, the tags respond at randomly generated times. In the deterministic algorithms, also called synchronous, the interrogator sorts through the tags based on their unique identification number.

This Invention incorporates by reference Rodgers application Ser. No. 11/686,946, titled "Precisely tuned RFID antenna". The Rodgers application describes a method of an RFID antenna manufacturing system whereby the RFID antenna becomes an integral part of an integrated circuit package. The RFID manufacturing system contemplated by the Rodgers application includes photoresist manufacturing techniques to produce a template or die specifically designed to mass produce RFID transponders whereby the chip and antenna becomes one integrated unit. The RFID antenna template or die is precisely tuned, using trimming algorithms and laser technology, to resonate with electro magnetic signal increments of 2 megahertz. According to this system each increment is assigned to a different category in a supply chain. This application reduces the cost, size and weight of prior art RFID transponders. This application reduces signal to noise ratio by producing precisely tuned antennas which provide a gatekeeper function directly correlated to ambient electro magnetic signals.

In using Rodgers application Ser. No. 11/686,946 the different category items at a consumer retail level can be assigned different frequencies in GHz. Each consumer category item can be separated by 2 megahertz through using precisely tuned antennas which are integral to the RFID transponder embedded or attached to each consumer item. In so doing the collision problem is solved in that each category item responds at a slightly different frequency. This is in contrast to one of the prior art methods of interrogator synchronization for coping with electro magnetic signal collision which is to program interrogators to operate at slightly different frequencies as described above. This is the dense interrogation mode type of solution. Furthermore, this Invention increases read rates due to the enclosed reading container. It also eliminates electromagnetic interference within the secure interrogation environment which further contributes to improved read rates.

This Invention is analogous to an RFID Portal. The best way to describe this is by way of a typical application. In a warehouse an RFID portal is best utilized where a forklift is moving inventory through a dock door. As the fork truck moves it is monitored by RFID electro magnetic interrogation. This is accomplished by antennas on the portal. The RFID portal is usually a warehouse dock door. The RFID Portal functions effectively because RFID tags on the case load pallets transported by the forklift truck pass through the signal from the interrogator(s) positioned via antennas on the dock door. The antennas of the portal may be connected to a single RFID interrogator or each antenna can connect to its own individual interrogator. The RFID tags, once energized by the interrogator, require a certain amount of time to power up and respond. It is important that the RF energy which is harvested at the tag remain at a level sufficient to sustain the functionality of the tag until data has been retrieved. This is known as dwell time, or time in beam. If the dwell time is too short the tag may power down prematurely and the read or write operation will not be completed.

This Invention is also analogous to an RFID Tunnel. RFID tunnels are a variation on the portal theme. They are typically used with a conveyor system. Tunnels are often enclosed in RF absorptive material such as anechoic material. This type of system is often referred to as a Faraday cage. Enclosing the tunnel helps contain the RF electro magnetic signal thereby concentrating the RF energy. The RFID Tunnel also reduces the power output requirement of the interrogator system. As with RFID Portals multiple antennas increase the read probability in an RFID tunnel. The enclosure helps to contain and concentrate the interrogation power of the system.

A Faraday cage is an enclosure formed by conducting material, or by a mesh of such material. The enclosure blocks out external static electrical fields. The electrical charges in the enclosing conductor, the metal or metal mesh, repel each other and reside on the outside of the cage. The result is that an external static electrical field will cause the charges to rearrange so as to completely cancel the effect within the interior of the cage. The concept as it relates to the present Invention is to design a structure which acts as an electromagnetic shield used to block radio frequency radiation. The concept is that the shield reduces the coupling of radio waves, electromagnetic fields and electrostatic fields. The amount of reduction depends on the material used in construction, its thickness and the resonating frequencies of the fields of interest. The present Invention proposes a design similar to that of a microwave oven. A typical microwave oven has a window built into it. As part of the glass window there is a metallic screen or mesh. This screen finishes a Faraday cage formed by the oven's metal housing.

The present Invention proposes a Faraday cage, made of insulating glass with a wire mesh embedded into it, to securely interrogate a vulcanized polymer insulated shopping cart, shopping basket or to interrogate individual RFID tagged consumer items. The cage ensures that the RFID electro magnetic signals emanating from the interrogator(s) are contained within the physical limitations of the cage as it is manufactured to the specifications of the shopping cart, shopping basket or individual item basis. These signals are then secure from being skimmed by nefarious entrepreneurs as the air interface is no longer shared, but contained. In other words, the scope of the air interface has been reduced because the conveyance fits snugly within the cage. The meshed glass enclosure allows the consumer to keep an eye on the consumer goods at all times of interrogation while concurrently containing the electro magnetic radiation within the metes and bounds of the Faraday cage type of enclosure. The enclosure blocks electro magnetic interference from outside forces thereby increasing read rates of RFID tags. Furthermore, the Faraday cage enclosure concentrates the RFID interrogation electro magnetic signals into a confined and hermetically sealed space thereby further increasing RFID tag read rates.

As a preferred embodiment, the consumer rolls a shopping cart into the meshed glass stall Faraday cage guided by tracks, similar to the guidance system within a car wash. The entrance door is dropped and sealed after the shopping cart is mechanically pulled into the enclosure. The interrogation takes place in complete electro magnetic privacy while remaining in physical sight of the customer. The shopping cart is automatically rolled out of the other end of the interrogation stall after RFID interrogation is complete to be retrieved by the consumer. The contact less smart card of the consumer can be interrogated simultaneously by placing the contact less smart card in a specially manufactured slot embedded into the shopping cart or shopping basket. In this way, the consumer items and the card are read in the same time and then tallied in a hermetically sealed environment. It is imperative that the shopping cart or shopping basket and card holder be covered with vulcanized polymer to obviate reflectance of metal surfaces. This system is called "Secure Self Scan" by the Inventor. The Inventor is in the process of filing a U.S. Trade Mark Application for "Secure Self Scan."

Rodgers application Ser. No. 11/733,949, titled "Clip Chip" is incorporated by reference in that it is envisioned by this Invention that the Clip Chip is part and parcel of the consumer items as they ingress and egress the Secure Self Scan system application Ser. No. 11/733,949 is a solution to RFID privacy concerns as these concerns relate to information about customer purchases of consumer goods. The inventive system of this application is known as Clip Chip. It surrenders control of the administration of privacy of personal information from the retailer to the consumer of retail goods. This is accomplished by splitting the RFID transponder into two pieces. On one piece, which is always attached to the consumer item, known as the retained piece, is a unique alpha numeric identifier. On the other piece, which can be detached from the consumer item, known as the detached piece, are the standard EPC data. The two pieces are connected by conductive ink. The consumer is empowered to disable the chip at the point of purchase by tearing the two pieces of the chip in two severing the conductive ink and thereby rendering both pieces of the chip moribund. Furthermore, the Clip Chip system contemplates a method to reconnect the circuit using a secure back end system upon the circumstance of a return of the consumer item for exchange or refund.

BRIEF DESCRIPTION OF THE DRAWINGS

FIG. 1 (Appendix A) shows the basic construction of the Secure Self Scan cage unit.

FIG. 2 (Appendix B) shows the start of the Self Scan process.

FIG. 3 (Appendix C) shows the completion of the Self Scan process.

DESCRIPTION OF THE PRIOR ART

The Inventor is aware of no prior art.

SUMMARY OF THE INVENTION

This invention is in the field of Radio Frequency Identification, known in the industry as RFID, and herein referred to as "RFID". RFID is a system in which radio frequency communication is used to exchange data. Usually this is done between some sort of mobile devices equipped with a memory component hooked to a host computing system. An example in current usage is the ubiquitous bar code system. This is a laser scanning technology whereby information is stored within the bar code label and retrieved from a reader through a scanning process. At the end of the day the bar code data is fed into a computing system which then makes sense of the data, such as linking a product to price. RFID systems are classified in accordance with the frequency used to excite the memory unit. They can also be classified by the type of carrier wave modulation used to interrogate the RFID tag and the method of data encoding. Many characteristics of an RFID system are determined by the excitation frequency. This includes the read/write range between the reader and tag, noise immunity, and penetration through various non-metallic objects. The excitation frequency has a bearing on antenna type, size and shape. The frequencies which are commercially available can be broken into three bands. First there is the low frequency band which operates between 100 and 500 kHz. Second the medium frequency which operates between 10 and 15 MHz. Third there is the high frequency systems which can be found at 850 to 950 MHz and at 2.4 to 5.8 GHz. There are a number of key components of an RFID system. The remote portion of the system is referred to as a tag or transponder. It contains an antenna, an integrated circuit, data storage space and can have the ability to be rewritable. In a passive set up the reader or interrogator provides power to the tag. A host computer interfaces with the reader and directs the interrogation via parallel, serial or bus communications.

The first function of the system is the initiating reader circuit which is based on a transfer of energy between two resonant circuits. The tag responds and is comprised of a coil or etched antenna and an application specific integrated circuit. The tags can be manufactured with or without internal power. Those tags without power are called passive. They are powered by charging an internal capacitor using the onboard antenna in conjunction with an externally provided electromagnetic field. Passive tags last for a long period of time and require no additional maintenance cost. In contrast, active tags are manufactured with onboard batteries to power the electronics and typically allow longer ranges between the host computer and tag via signal amplification but require battery replacement or recharging.

The operational frequency of the RFID system will determine the shape, size, and geometry for the system tag and its antenna. The tags are usually encapsulated to resist environmental affects. The encapsulation materials are usually glass or plastic. This protects the electronics from moisture, shock, corrosion, wear and electrical shorts. The antenna of an RFID system enables a device to convert current and voltage into an electro magnetic signal. Both sides of the equation, interrogator and tag, are required to have an antenna. The transmission frequency will determine whether a magnetic coil antenna, loop, patch, micro strip or an electric dipole design is required.

There is a final step in the RFID system. That is the connection to a host computing system. This system can determine in which mode the interrogator operates. In an environment were tags are passing near the antenna the interrogator can be instructed by the host computing system to always be alert to tags. However, if the antenna of the interrogator were to become portable, the host computer may instruct the reader to energize only at the users command.

The primary market for RFID systems is in any area where optical scanning is used. However, it can also be used where optics would not operate. This includes harsh environments, high speed tracking, identifying hidden items or for long range package scanning.

There are two main methods of transmitting data. First there is the full duplex model whereby the tag communicates its data by modulating the carrier wave of the interrogator. This is accomplished by applying a resistive load. A transistor which acts as a load modulator shorts the antenna circuit in sequence to the data. This removes the antenna from resonance at the excitation frequency thereby removing power draw from the interrogator's carrier wave. At the interrogator side of the equation this loading and unloading is read and the data can be reconstructed. Second, in a half duplex RFID system the carrier wave transmits power and then pauses. During the pause period the tag transmits data to the interrogator. It is imperative that of RFID technology which allows eavesdropping and unauthorized RFID tag reading. This type of nefarious activity poses security threats to individual consumers. The problem has its genesis in the fact that radio is a transparent medium: it is easy for an intruder to either eavesdrop on the communication between the tag and the reader (eavesdropping); or query the tag without authorization (skimming).

This invention proposes to reduce the insecurity of the shared and transparent medium, the air, by reducing the scope of the shared medium. This has the result of producing privacy of communication between reader and tag as well as increased read rates due to reduced electro magnetic interference and more concentrated interrogation of backscattered electro magnetic signals. For example, this invention contemplates in one of the preferred embodiments an elegant solution which retains all of the features of RFID convenience while removing the air medium security risk. One of the preferred embodiments of this invention contemplates a hermetically sealed glass encased Faraday cage; known commercially as Secure Self Scan (hereinafter "S3"). This invention contemplates an RFID enabled, contact less, smart (credit) card being securely read (interrogated) in a sealed environment concurrently with the tally of consumer items contained in an insulated shopping cart. The method of operation is that when a consumer presents her contact less smart card to the retailer for check out, the card goes directly into a holding slot manufactured into the insulated shopping cart. The shopping cart is wheeled close to the entrance of a meshed glass enclosed interrogation unit. The front wheels of the shopping cart are mechanically pulled and directed into the correct reading position by the machinery of the enclosed interrogation unit. The mechanism is similar to that of an automatic car wash guidance system. Once mechanically pulled inside the enclosed interrogation unit the entrance is sealed and a micro second radio frequency scan of the contact less smart card and the consumer items within the shopping cart is conducted. The monetary value of the consumer goods contained within the shopping card is electronically tallied and deducted from the contact less smart card. The consumer obtains a receipt by E-Mail to a home computer or by text message to a cellular telephone or by the traditional paper method. When the interrogation is complete the exit door is opened and a mechanical pulley system drives the shopping cart from the enclosed interrogation unit into the hands of the consumer. The enclosed interrogation unit is manufactured from electro magnetically inert glass meshed with metal so that the consumer can continue to view the shopping cart, the contact less smart (credit) card and the purchased consumer items during the entire time of interrogation. After the interrogation the RFID tag attached to each consumer item can be clipped by the consumer using the Clip Chip technology described herein to enhance consumer privacy. The design of the enclosed interrogation unit is that of a protective and hermetically sealed meshed metal glass and sheet metal containment device which absolutely precludes the possibility of skimming or eavesdropping. This is accomplished by taking a container which uses the raw material glass, an inert commodity, and sealing all edges to obviate electro magnetic seepage. The interior of the container is a combination of microwave reflectors with edge level shielding which will magnify GHz frequency electromagnetic signals, enabling the interrogator electro magnetic signals to be hermetically sealed and to produce amplified electro magnetic signals. The edge level absorbers are thin, magnetically loaded elastomeric sheets designed to provide protection at high angles of incidence for surface wave attenuation. Absorbing elastomer and composite metals located within the glass containment housing of this container is designed to meet the needs of radiation confinement for a high frequency application in the 24 to 40 GHz frequency range. The described process retains the contact less credit card and the consumer items in the exact position for accurate and secure RFID tag reading without fear of skimming or eavesdropping. In other words, the contact less credit card and consumer items are mechanically processed through a type of hermetically sealed Faraday cage which completely encloses and envelops the interrogation environment obviating electro magnetic seepage or leakage as well as containing and amplifying electro magnetic interrogation signals. This process also applies to interrogation of contact less smart cards associated with individual items. The reading of the tags and contact less smart card is accomplished using a number of antennas in a multiplex array strategically placed inside and under the hermetically sealed glass interrogation unit. This multiplex antenna array is connected to one interrogator which in turn is connected to a back end host computer system. In this configuration and in using Secure Self Scan the electro magnetic signal collision problem is solved by having consumer categories resonating at frequencies which are 2 megahertz apart using the precisely tuned antenna methodology described in the Rodgers Application titled, "Precisely tuned RFID antenna". The electro magnetic frequencies are rolled by the interrogator through all of the antennas, much like in the dense reader mode aforementioned, so that all precise frequencies utilized within any specifically engineered Secure Self Scan system is fully interrogated.

The useful, non-obvious and novel steps of this invention include the manufacture and use of a hermetically sealed Faraday cage in the retail/consumer goods environment using meshed glass and sheet metal as agents of containment. The utility of this invention is that it guards against unauthorized access to RFID tagged consumer items and contact less smart cards without resort to software encryption or biometric protection. Using cryptography or biometrics would render the RFID interrogator subject to hacking. Using cryptography or biometrics for contact less smart cards would render them too expensive for commercial use due to the increased computing space required for the cryptographic or biometric data. Malware writers and hackers follow the money trail. This invention takes the malware writer and hacker plus skimmer and eavesdropper out of the RFID equation in relationship to consumer goods and consumer privacy. Furthermore, this invention magnifies interrogation signals thereby increasing read rate and obviates electro magnetic interference, called noise, thereby increasing read rates.

I claim:

1. A Radio Frequency Identification (RFID) system and method which prevents unauthorized access to communication protocols between RFID tagged consumer items and an RFID interrogator and which said system and method still further prevents unauthorized access to communication protocols between an RFID interrogator and a contactless smart card, comprising: a hermetically sealed Faraday cage container (Secure Self Scanconstructed of metal meshed glass, metal sheeting and elastomer sealant, said Faraday cage container fitted with a mechanical pulley or automated conveyor system for the purpose of securely reading RFID tagged consumer items and contact less smart cards when the RFID tagged consumer items and contact less smart cards are located within a consumer shopping cart; an array of interrogation antennas located within the hermetically sealed Faraday cage said array of interrogation antennas having means to radiate different wavelengths of interrogation frequencies; interrogation process means (Secure Self Scan process); a retailer(s); consumer(s); consumer shopping basket; consumer shopping cart individual RFID tagged consumer items; an individual contact less smart card.

2. The system and method of claim 1 whereby further the shopping cart, consumer shopping basket or individual tagged consumer items are mechanically inducted into the hermetically sealed Faraday cage and mechanically ejected from the hermetically sealed Faraday cage using a series of pulleys or a conveyor belt mechanism for the purpose of ensuring customer convenience and safety.

3. The system and method of claim 1 whereby further the said hermetically sealed said Faraday cage container, known as the Secure Self Scan, is constructed in part of metal wire meshed glass, metal wire meshed glass consisting of circles which are smaller in diameter than the wavelengths of the interrogation frequencies radiated from the array of interrogation antennas located within the hermetically sealed Faraday cage and still further said metal wire meshed glass being similar to the glass windows normally contained in microwave ovens, and said metal wire meshed glass being constructed internally in a fashion similar to a microwave oven in that metal sheeting is used to ensure maximum interrogation power through reflection and a minimum of radiation seepage through reflection.

4. The method of claim 1 whereby further the hermetically sealed Faraday cage is a combination of a microwave reflective materials such as metal sheets and metal wire meshed glass along with edge level shielding made of thin, magnetically loaded elastomeric sheets so that electromagnetic radiation of the interrogation process is completely contained within the hermetically sealed Faraday cage.

5. The method of claim 1 whereby further the Faraday cage type containers, also known as Secure Self Scan containers, are retailer custom design constructed to house shopping carts, hand held shopping baskets and individual items in the measured proportions which relate to the design of any specific retailer so that the said shopping carts, shopping baskets and individual items can be automatically and conveniently interrogated.

6. The method of claim 1 whereby further the consumer shopping carts and consumer shopping baskets are protectively covered with insulating material, such as vulcanized polymers, in order to obviate reflective electromagnetic interference with the interrogation process which would be the result of using metal shopping carts or metal hand held shopping baskets.

7. A Radio Frequency Identification (RFID) system and method which prevents unauthorized access to communication protocols between RFID tagged consumer items and an RFID interrogator and which said system and method still further prevents unauthorized access to communication protocols between an RFID interrogator and a contactless smart card, comprising: a hermetically sealed Faraday cage container (Secure Self Scan) constructed of metal meshed glass, metal sheeting and elastomer sealant, said Faraday cage container is fitted with a mechanical pulley or automated conveyor system for the purpose of securely reading RFID tagged consumer items and contact less smart cards when the RFID tagged consumer items and contact less smart cards are located within a consumer shopping cart; an array of interrogation antennas located within the hermetically sealed Faraday cage said array of interrogation antennas having means to radiate different wavelengths of interrogation frequencies; interrogation process means (Secure Self Scan); a retailer(s); consumer(s); consumer shopping basket; consumer shopping cart individual RFID tagged consumer items; an individual contact less smart card; and still further a system and method whereby the contactless smart card can be read as a standalone item in a Faraday cage device as described herein and located next to the Faraday cage device designed for individual RFID tagged consumer items.

* * * * *